(12) United States Patent
Backus et al.

(10) Patent No.: US 6,804,287 B2
(45) Date of Patent: Oct. 12, 2004

(54) ULTRASHORT PULSE AMPLIFICATION IN CRYOGENICALLY COOLED AMPLIFIERS

(75) Inventors: Sterling J. Backus, Longmont, CO (US); Henry C. Kapteyn, Boulder, CO (US); Margaret Mary Murnane, Boulder, CO (US)

(73) Assignee: The Regents of the University of Colorado, a body corporate, Boulder, CO (US)

(*) Notice: Subject to any disclaimer, the term of this patent is extended or adjusted under 35 U.S.C. 154(b) by 17 days.

(21) Appl. No.: 10/062,584

(22) Filed: Feb. 2, 2002

(65) Prior Publication Data

US 2003/0147443 A1 Aug. 7, 2003

(51) Int. Cl.[7] ............................................. H01S 3/091
(52) U.S. Cl. ..................................... 372/70; 372/35
(58) Field of Search ............................ 372/30, 35, 25, 372/29.01, 70–75, 6, 51, 52, 21, 42, 69

(56) References Cited

U.S. PATENT DOCUMENTS

| | | | | |
|---|---|---|---|---|
| 3,597,695 A | | 8/1971 | Swain ........................ 330/4.3 |
| 3,638,140 A | * | 1/1972 | Knapp et al. ................ 372/34 |
| 3,936,772 A | * | 2/1976 | Sucov et al. ................. 372/56 |
| 3,970,960 A | * | 7/1976 | Mollenauer .................. 372/42 |
| 4,100,507 A | * | 7/1978 | Born et al. ................... 372/90 |
| 4,119,929 A | * | 10/1978 | Shackleford et al. ........ 372/26 |
| 4,896,119 A | | 1/1990 | Williamson et al. ........ 330/4.3 |
| 5,239,408 A | | 8/1993 | Hackel et al. .............. 359/338 |
| 5,285,310 A | | 2/1994 | Miller et al. ............... 359/338 |
| 5,615,043 A | * | 3/1997 | Plaessmann et al. ....... 359/346 |
| 5,644,424 A | * | 7/1997 | Backus et al. ............. 359/347 |
| 5,790,303 A | * | 8/1998 | Weston et al. ............. 359/345 |
| 5,963,363 A | * | 10/1999 | Weston et al. ............. 359/345 |
| 5,987,049 A | * | 11/1999 | Weingarten et al. ......... 372/70 |
| 6,055,249 A | * | 4/2000 | Masuda ....................... 372/22 |
| 6,122,097 A | * | 9/2000 | Weston et al. ............. 359/345 |
| 6,144,484 A | | 11/2000 | Marshall .................... 359/333 |
| 6,154,478 A | * | 11/2000 | Vetrovec ...................... 372/89 |
| 6,181,461 B1 | * | 1/2001 | Wada et al. ................ 359/326 |
| 6,240,111 B1 | * | 5/2001 | Kubota et al. ............... 372/21 |
| 6,249,371 B1 | * | 6/2001 | Masuda et al. ............ 359/326 |
| 2002/0034198 A1 | * | 3/2002 | Masuda ......................... 372/5 |
| 2002/0171912 A1 | * | 11/2002 | Masuda .................... 359/326 |
| 2003/0099262 A1 | * | 5/2003 | Masuda ....................... 372/21 |

OTHER PUBLICATIONS

Backus, S., Dufee III, C.G., Mourou, G. Kapteyn, H. C., Murnane, M. M., "0.2–TW laser systemat 1 KHz", Optics Letters/vol. 22, No. 16/Aug. 15, 1997.

Backus, S., Durfee III, C. G., Murnane, M. M., Kapteyn, H. C., "High power ultrafast lasers", Review Of Scientific Instruments, vol. 69, Mumber 3, Mar. 1998.

* cited by examiner

*Primary Examiner*—Don Wong
*Assistant Examiner*—Tuan N. Nguyen
(74) *Attorney, Agent, or Firm*—Jennifer L. Bales; Macheledt Bales Heidmiller

(57) ABSTRACT

A laser amplifier system amplifies pulses in a single "stage" from $\sim 10^{-9}$ joules to more than $10^{-3}$ joules, with average power of 1–10 watts, and beam quality $M^2 < 2$. The laser medium is cooled substantially below room temperature, as a means to improve the optical and thermal characteristics of the medium. This is done with the medium inside a sealed, evacuated or purged cell to avoid moisture or other materials condensing on the surface. A "seed" pulse from a separate laser is passed through the laser medium, one or more times, in any of a variety of configurations including single-pass, multiple-pass, and regenerative amplifier configurations.

20 Claims, 6 Drawing Sheets

Laser system diagram

Laser system diagram

Pump Beam Delivery

Multipass Amplifier

Regenerative Amplifier

Single Pass

ULTRASHORT PULSE AMPLIFICATION IN CRYOGENICALLY COOLED AMPLIFIERS

The present invention was made with government support under Contract Number DE-FG03-99ER1498 awarded by the Department of Energy and Contract Number Phy 95-12150 awarded by the National Science Foundation.

BACKGROUND OF THE INVENTION

1. Field of the Invention

The present invention relates to high gain amplification of coherent light in a laser medium that has been cryogenically cooled. In particular, the present invention relates to high gain ultrashort pulse amplification in cryogenically cooled amplifiers.

2. Description Of the Prior Art

Past work has demonstrated various schemes for amplification of pulsed (or continuous) laser light from pulse energies typical of mode-locked lasers ($10^{-6}$ to $10^{-10}$ Joules), up to energies of $10^{-6}$ Joules or higher. The higher energies are necessary for many applications, including wavelength conversion of light, micromachining and laser surgery.

Past work by the current inventors has demonstrated that the use of cryogenically-cooled laser media (here defined as cooling the laser medium to a temperature below that which can be achieved using widely used water or antifreeze-water cooling systems, or through thermoelectric cooling schemes) can be effective in allowing pulse amplifiers to handle very high average powers of >3 watts, with high conversion efficiency of pump light to amplified laser light, and with simultaneously near-gaussian ($TEM_{00}$) beam quality. This is a result of the higher thermal conductivity of the laser medium (in this case titanium-doped sapphire) at low temperatures, combined with the reduced value of index change with temperature for the laser medium at low temperatures. In the past work, the cryogenically-cooled crystal was used in a low-gain configuration, as a "power amplifier" that followed a more-conventional non-cryogenically-cooled amplifier stage.

The following two works describe past work by the present inventors in using cryogenically-cooled ti:sapphire for low-gain, high-power amplification of ultrashort pulses:

S. Backus, C. Durfee, M. M. Murnane, and H. C. Kapteyn, "High Power Ultrafast Lasers," Review of Scientific Instruments, vol. 69, pp. 1207–1223, 1998.

S. Backus, C. G. I. Durfee, G. A. Mourou, H. C. Kapteyn, and M. M. Murnane, "0.2-TW laser system at 1 kHz," Optics Letters, vol. 22, pp. 1256–1258, 1997.

Other prior art inventions focus on amplifying ultrashort pulses in color-center laser media or very similar f-centers media. In these lasers, the active medium is a crystal (NaCl, KCl, and others) that can be temporarily "damaged" using radiation. The damage sites in the crystal (f-centers or color centers) can act as the "dopant" or active atom in the host crystal, and lasers and laser amplifiers can be made using these media. However, these color centers will anneal-out of the crystal over time, and this usually necessitates cooling of the crystal to cryogenic temperatures to avoid fading-out of the lasing action. Ultrafast and other amplifier systems using these media have been built. However, the distinguishing characteristics of these systems from the present invention is that 1) the reason for cooling is primarily to preserve the laser medium, not to enhance its optical and thermal characteristics; 2) the power level of these lasers has generally been lower, not higher, than that of the prevailing ultrafast laser-amplifier technology; i.e. less than 100 milliwatts (as opposed to several watts); and 3) the total gain demonstrated in any of these systems has been limited to well under $10^6$ ($2.2 \times 10^5$). In none of these works are the thermal or thermal-optic characteristics of the material even mentioned, since in general this is not a consideration for lasers emitting average powers of <<1 watt.

The following works describe past laser amplifier systems that utilized "color-center" laser materials:

G. Lenz, W. Gellermann, D. J. Dougherty, K. Tamura, and E. P. Ippen, "Femtosecond fiber laser pulses amplified by a KCl:Tl+ color-center amplifier for continuum generation in the 1.5-mu m region," Optics Letters, vol. 21, pp. 137–139, 1996.

G. Sucha, S. R. Bolton, and D. S. Chemla, "Generation of High-Power Femtosecond Pulses Near 1.5-Mu-M Using a Color-Center Laser System," Ieee Journal of Quantum Electronics, vol. 28, pp. 2163–2175, 1992.

G. Sucha and D. S. Chemla, "Kilohertz-Rate Continuum Generation By Amplification of Femtosecond Pulses Near 1.5-Mu-M," Optics Letters, vol. 16, pp. 1177–1179, 1991.

Schneider and C. L. Marquardt, "Broadly Tunable Oscillator-Amplifier System Using Lithium (F-2+)a Centers in Kcl," Optics Letters, vol. 10, pp. 13–15, 1985.

A need remains in the art for single stage high power amplification of coherent light.

SUMMARY OF THE INVENTION

An object of the present invention is to provide single stage high power amplification of coherent light.

A relatively simple laser amplifier system amplifies pulses in a single "stage" from ~$10^{-9}$ joules to more than $10^{-3}$ joules, with unprecedented average power (1–10 watts, and in future hundreds of watts) and exceptional beam quality ($M^2<2$). Thus, very high gain and high output power is achieved simultaneously in a simple, single-stage amplifier system, as a result of cryogenic cooling of the laser medium.

The laser medium is cooled substantially below room temperature, as a means to improve the optical and thermal characteristics of the medium. This is done with the medium inside a sealed, evacuated or purged cell to avoid moisture or other materials condensing on the surface. A "seed" pulse from a separate laser is passed through the laser medium, one or more times, in any of a variety of configurations including single-pass, multiple-pass, and regenerative amplifier configurations. The energy of the input pulse is amplified by a factor of more than 250,000 times using the single gain medium.

As a result, the amplifier can start with a very low energy pulse, and efficiently amplify the pulse to high energy, with high conversion efficiency of "pump" energy into energy of the amplified light pulse, in a simple, single-stage amplifier. The resulting output pulse energy will often reach the "saturation fluence" where the total extracted power approaches the power injected into the laser amplifier. In our implementation of this scheme, a total optical-to-optical conversion efficiency of >25% was achieved in some cases. This compares with a maximum of 15% obtained using the same optical configuration but without cryogenic cooling.

The amplifying medium might have a host selected from the following list: Sapphire ($Al_2O_3$), Yttrium-Aluminum Garnett ($Y_2Al_5O_{12}$), Yttrium-Lithium Flouride ($LiYF_4$), LiSAF ($LiSrAlF_4$), LiCAF ($LiCaAlF_4$), $KY(WO_4)_2$, $YVO_4$, or $YAlO_3$. The amplifying dopant might be selected from the following list: Titanium ($Ti^{3+}$), Neodymium ($Nd^{3+}$), Chromium ($Cr^{3+}$), Holmium ($Ho^{3+}$), Erbium ($Er^{3+}$), Thulium ($Tm^{3+}$), Praseodymium ($Pr^{3+}$), Ytterbium ($Yb^{3+}$), Europium ($Eu^{3+}$), Dysprosium ($Dy^{3+}$), or Terbium ($Tb^{3+}$).

Hence, the amplifying medium might be selected from the following list: $Nd^{3+}:Y_3Al_5O_{12}$, $Nd^{3+}:YAlO_3$, $Ti^{3+}:Al_2O_3$, $Ce^{3+}:LiCaAlF4$, $Ce^{3+}:LiSrAlF_4$, $Nd^{3+}:LiYF_4$, $Yb^{3+}:Y_3Al_5O_{12}$, $Cr^{3+}:Al_2O_3$, $Cr^{3+}:LiCaAlF_4$, $Cr^{3+}:LiSrAlF_4$, $Pr^{3+}:LiYF_4$, $Nd^{3+}:KY(WO_4)_2$, $Ho^{3+}:YAlO_3$, $Ho^{3+}:Y_3Al_5O_{12}$, $Ho^{3+}:LiYF_4$, $Er^{3+}:LiYF_4$, $Er^{3+}:Y_3Al_5O_{12}$, $Er^{3+}:YAlO_3$, $Tm^{3+}:YAlO_3$, or $Tm^{3+}:Y_3Al_5O_{12}$ The pump laser might be selected from the following list: diode-pumped frequency doubled Nd:YAG, lamp-pumped frequency doubled Nd:YAG, semiconductor diode laser, ruby laser, diode-pumped Nd:Vanadate, or diode-pumped Nd:YLf.

The amplifying medium might comprise titanium doped sapphire. The amplifying medium might be a non-linear parametric amplification medium, allowing a single pass, high gain configuration. Alternatively, the amplifier might have a regenerative amplifier configuration or a multipass amplifier configuration. Fiber optics could be used for transmitting light between the pump laser and the amplifier.

DETAILED DESCRIPTION OF THE PREFERRED EMBODIMENT

Figure 1:
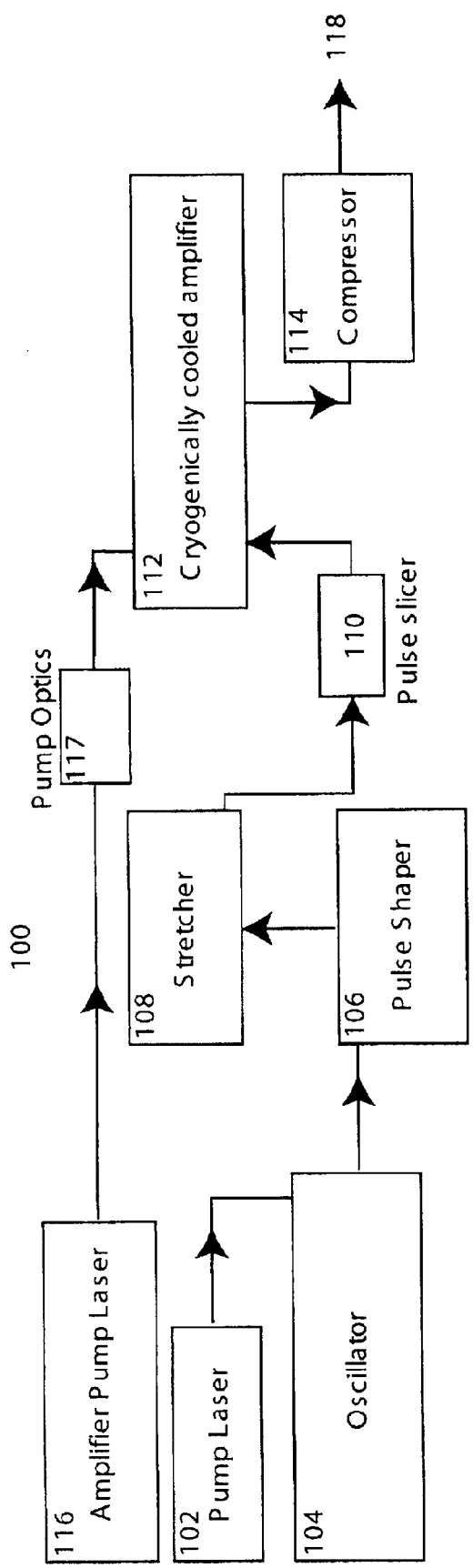
FIG. 1 is a flow chart showing a cryogenically cooled ultrafast laser amplifier system according to the present invention.

FIG. 1 shows a flow chart for cryogenically cooled ultrafast laser amplifier system. In an example preferred embodiment, input pulses are created by mode locked Ti:sapphire laser 104 pumped by diode-pumped CW laser 102 generating 532 nm light in a TEMoo mode. The mode locked pulse repetition-rate is ~82 MHz. The pulses are then put into a pulse shaper 106, which can modify the amplitude and or phase of the pulses. The pulses are then stretched in pulse stretcher 108, from ~10–20 fs, to ~50 to 200 ps. The pulse repetition frequency is then reduced by electro-optic pulse slicer 110 to the selected repetition rate of ~10 Hz up to ~20 kHz.

After the pulse slicer, the pulses are injected into the cryogenically cooled amplifier 112 which is the heart of the present invention. Amplifier 112 is shown in more detail in FIGS. 2 and 4. Amplifier 112 is pumped by diode-laser-pumped high-average-power pulse laser 116 generating ~50–200 ns duration pulses at 532 nm, with a pulse spatial quality $M^2$ of 25–30, via pump relay optics 117 (shown in more detail in FIG. 3). The pulses are amplified from a pulse energy of ~$10^{-8}$ to $10^{-10}$ joules, up to an energy of $10^{-2}$ to $10^{-4}$ joules.

Fiber optics may be used to transmit the light where convenient, for example between the pump laser and the amplifier.

Figure 2:
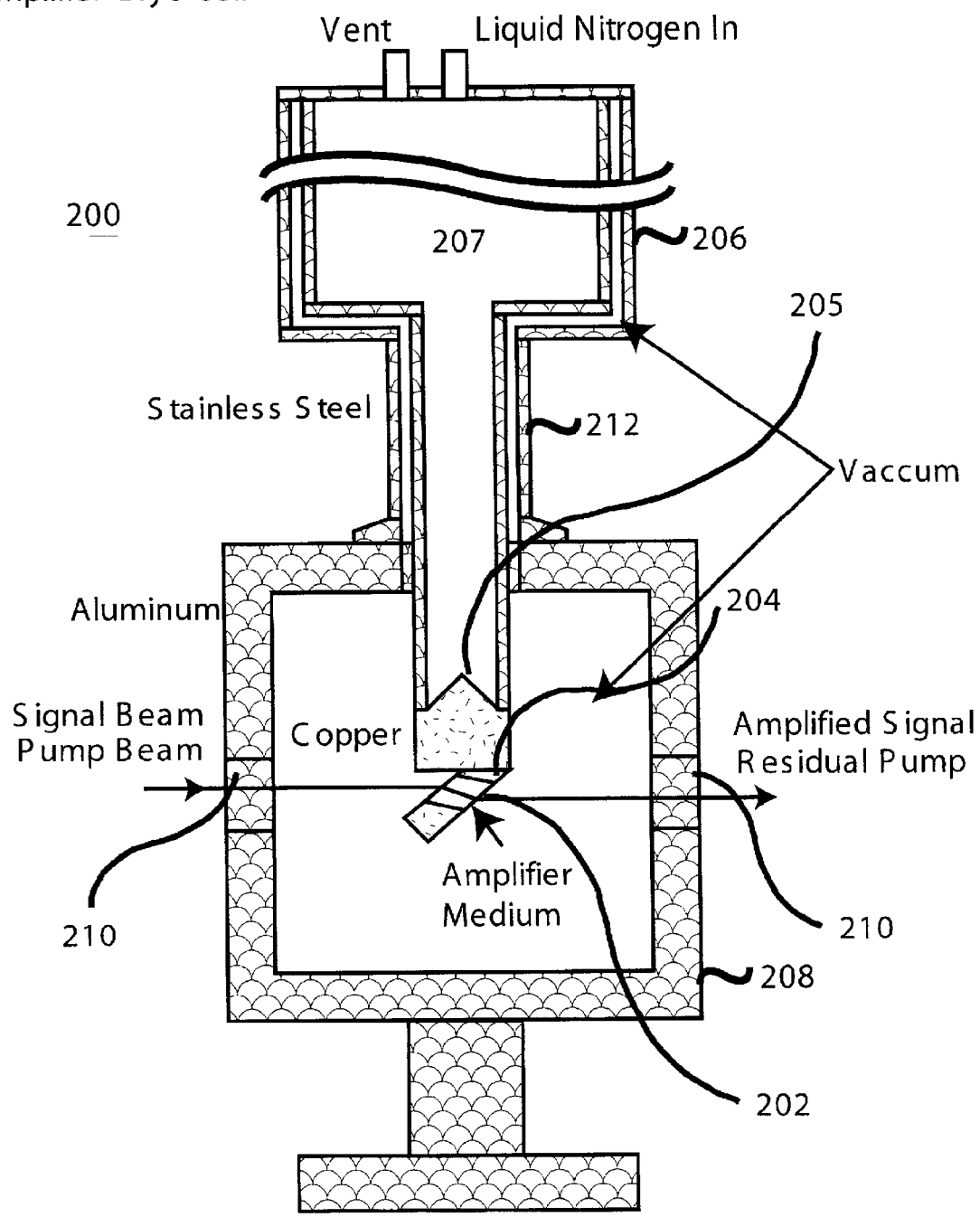
FIG. 2 is a side cutaway view of the cryogenically cooled portion of the amplifier of FIG. 1.
Figure 4:
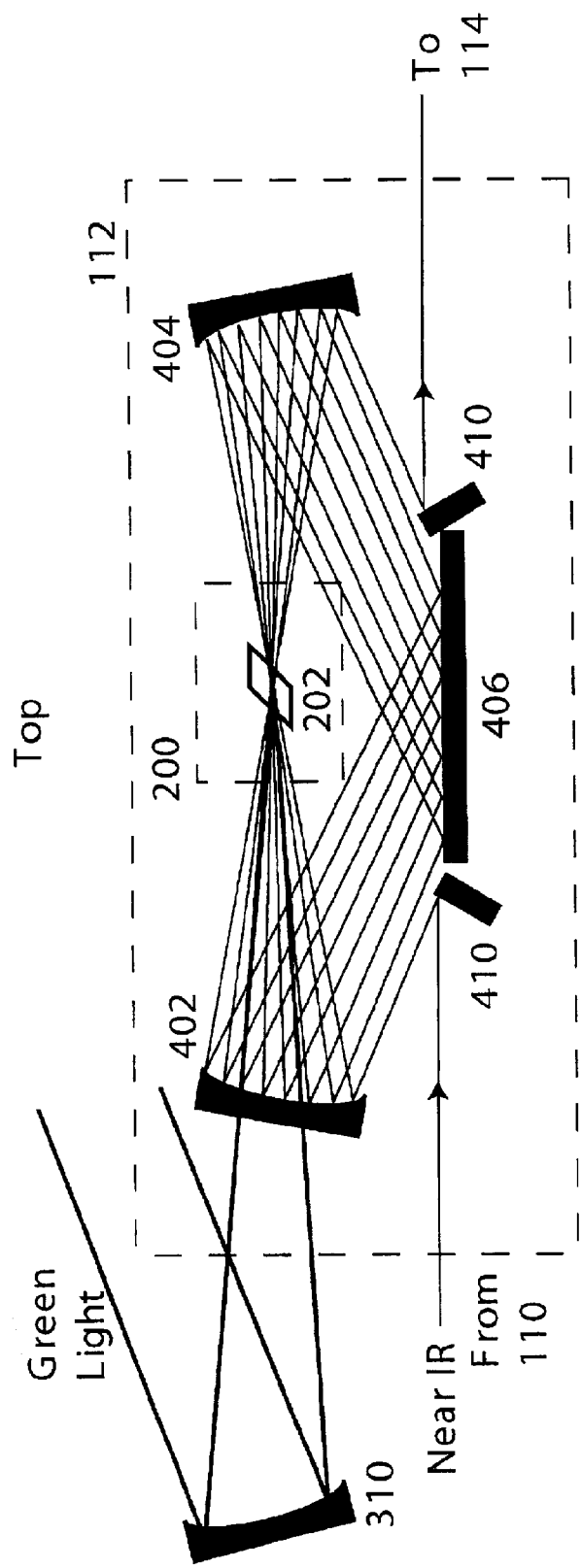
FIG. 4 is a top view diagram of a multipass amplifier according to FIG. 1.

FIG. 2 shows the preferred embodiment of cryogenically cooled portion 200 of amplifier 112 in more detail. FIG. 4 illustrates the operation of amplifier 112.

Turning to FIG. 2, amplifier medium 202 is clamped in a copper holder mounted to a copper mount assembly 204 containing a cone shape plug 205 (for enhanced heat-transfer area). Assembly 204 is then soldered or brazed to vacuum-insulated stainless steel container 206 that holds the cryogen (e.g. Liquid nitrogen). Container 206 is then mounted to aluminum/stainless steel chamber 208, which can be evacuated or purged with He. The chamber contains windows 210 either antireflection-coated or brewster-angled for passage of the pump and signal beams.

As an example, cryogenically-cooled cell 206 could consist of a 2 liter insulated stainless steel can, connected to vacuum cell 208 enclosing Ti:sapphire crystal 202. A stainless steel pipe 212 brings liquid nitrogen 207 ($LN_2$) into vacuum cell 208, and is connected to copper mount 204 holding Ti:sapphire crystal 202. Vacuum cell 208 has Brewster-angle windows 210 for the entry and exit beams, with a total vacuum beam path of 20 cm. Good heat conduction from the $LN_2$ 207 to Ti:sapphire crystal 202 is provided; e.g. a hole is bored directly into crystal mount 204 to ensure a large area for heat conduction. The temperature of crystal 202 may be monitored using a type K thermocouple (not shown), sandwiched between Ti:sapphire 202 and copper mount 204. One possible alternative to liquid-nitrogen cooling is to use a closed-cycle refrigerator, such as the CryoTiger (from APD cryogenics).

The output beam quality from the preferred embodiment of amplifier 112 is good, with a measured $M^2$ of 1.20 and 1.36 in the X and Y directions respectively. The deviation in $M^2$ from the diffraction limit is likely the result of thermal loading of the diffraction gratings which are integral to the pulse compressor. The gratings use a zerodur substrate, with an epoxy grating replica layer containing the rulings. This epoxy layer is overcoated with gold, resulting in a diffraction efficiency of 94%. For incident powers of 13W in a beam diameter of 2.5 cm, the absorbed power heats the epoxy layer, deforming it and leading to a beam distortion that varies with incident spot size.

Laser system 100 may be used to generate EUV light at high repetition-rate. A 600 microjoule, 7 kHz, 24 fs, pulse train is injected into a 175 micron diameter argon-filled hollow fiber. After rejection of the laser light using a 0.2 micron aluminum filter, the HHG beam is observed to have intensities consistent with results at lower repetition rates. The EUV generation cell operates over a period of hours with no adverse effects. Note also that laser 100 is continuously tunable from 1 to 10 kHz without change in amplifier characteristics. Average output powers reach up to 13W maximum from the laser amplifier, which is the highest average power demonstrated from a single-stage, ultrashort pulse amplifier system to date. After emerging from the laser amplifier, the pulses are recompressed to 24 fs duration using the grating pair; above mentioned losses from the gratings reduce the output power to 8 Watts. Other embodiments of the laser amplifier may not require recompression, or may incorporate more efficient compression techniques.

Many other amplifier media may be successfully used in the laser amplifier of the present invention. Examples include Sapphire ($Al_2O_3$), Yttrium-Aluminum Garnett ($Y_2Al_5O_{12}$), Yttrium-Lithium Fluoride ($LiYF_4$), LiSAF ($LiSrAlF_4$), LiCAF ($LiCaAlF_4$), $KY(WO_4)_2$, $YVO_4$, $YAlO_3$. The amplifying dopant could be selected from the following examples: titanium ($Ti^{3+}$), neodymium ($Nd^{3+}$), chromium ($Cr^{3+}$), holmium ($Ho^{3+}$), erbium ($Er^{3+}$), thulium ($Tm^{3+}$), praseodymium ($Pr^{3+}$), ytterbium ($Yb^{3+}$), europium ($Eu^{3+}$), dysprosium ($Dy^{3+}$), or terbium ($Tb^{3+}$).

Figure 3:
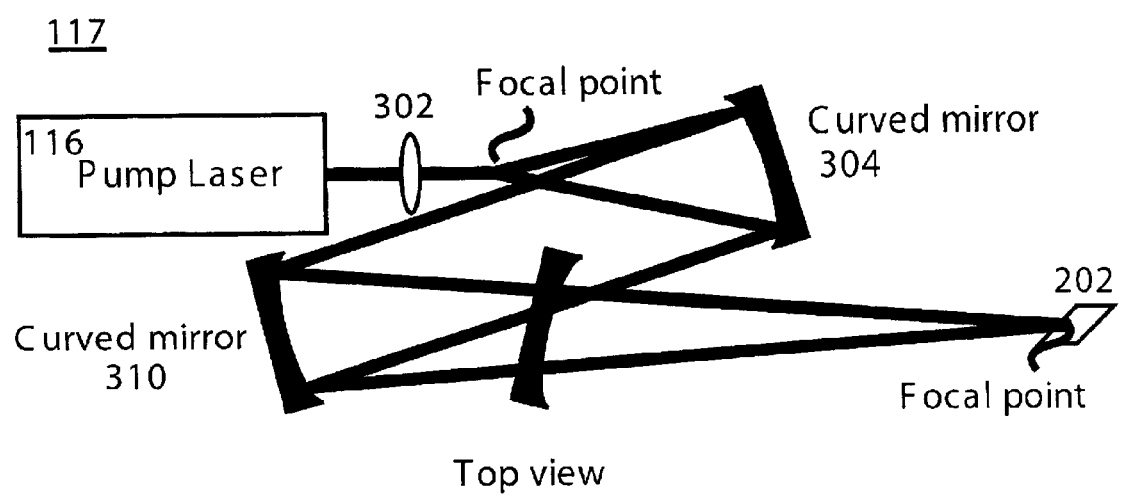
FIG. 3 is a top view diagram of the pump relay optics of FIG. 1.

FIG. 3 is a top view diagram of the pump relay optics 117 of FIG. 1. Pump relay optics 117 is designed to take a laser beam with poor beam character from pump laser 116, and focus it to a useful size. The beam is first expanded, in order to allow the focussing elements to be located outside of amplifier 112. Pump laser 116 provides a laser beam that is expanded to 5 cm by lens 302, before being focussed onto amplifier medium 202 by concave mirrors 304 and 310. Pump relay optics 117 takes a laser beam of $M^2$ of around 30 and focusses it to to a spot size of about 750 $\mu$m. The ultrashort pulse then efficiently extracts this energy in a near-diffraction-limited beam.

A variety of pump lasers may be used in the present invention. Examples include diode-pumped frequency doubled Nd:YAG (e.g. Coherent Corona), lamp-pumped frequency doubled Nd:YAG (e.g. Quantronix model 527), semiconductor diode laser, ruby laser, diode-pumped Nd:Vanadate, and diode-pumped Nd:YLf (e.g. Positive Light Evolution series).

FIG. 4 is a top view diagram of an example of a multipass amplifier 112 of to FIG. 1. The laser pumping of amplifier 112 preferably is accomplished as follows. Amplifier 112 is pumped by a diode-pumped frequency-doubled Nd:YAG laser 116 (for example Coherent Inc. Corona). Pump relay optics 117 (shown in more detail in FIG. 3) focus the laser beam via curved mirror 310 onto amplifier medium 202.

The beam is focused into crystal 202 through one of the 800 nm high-reflector mirrors 402 of the multipass amplifier, with a spot size of 750 $\mu$m. The crystal itself is a 1 cm diameter, Brewster cut, 0.25% doped Ti:sapphire rod (e.g. Bicron Inc.). The high angle of incidence flat (1"x4") mirror 406 in the multipass amplifier is specially designed for maximum bandwidth, low spectral phase aberration, and high damage threshold at high angle of incidence (e.g. Alpine Research Optics Inc.). The polarization of the amplifier beam is "S" (perpendicular to the plane of the table), to obtain maximum bandwidth of the dielectric mirrors, and for ease of cooling of the amplifier crystal. Mirror 404 completes the multi-pass path for the pump beam. Pulses from pulse slicer 110 reflect off of mirror 410 into the path. Output beam pulses reflect off of mirror 410 out to compressor 114.

Figure 5:
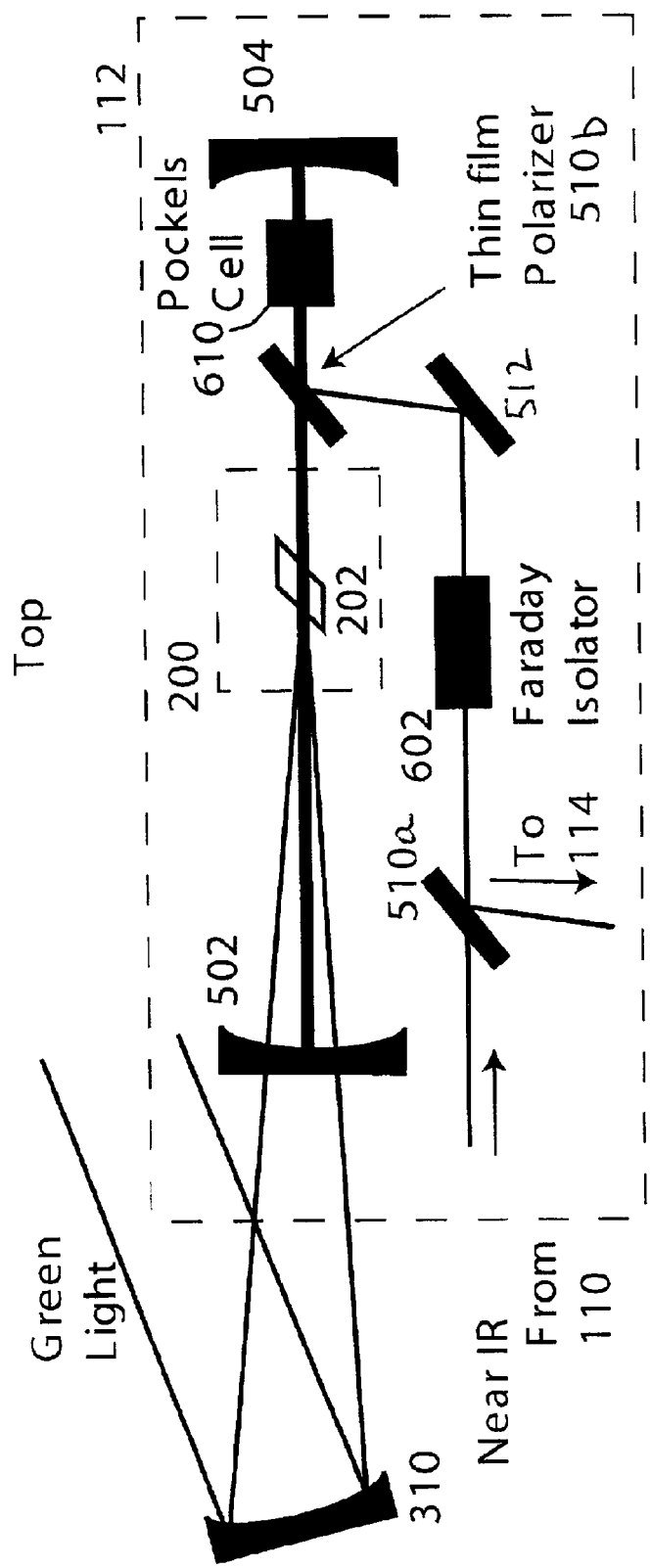
FIG. 5 is a top view of a regenerative amplifier according to FIG. 1.
Figure 6:
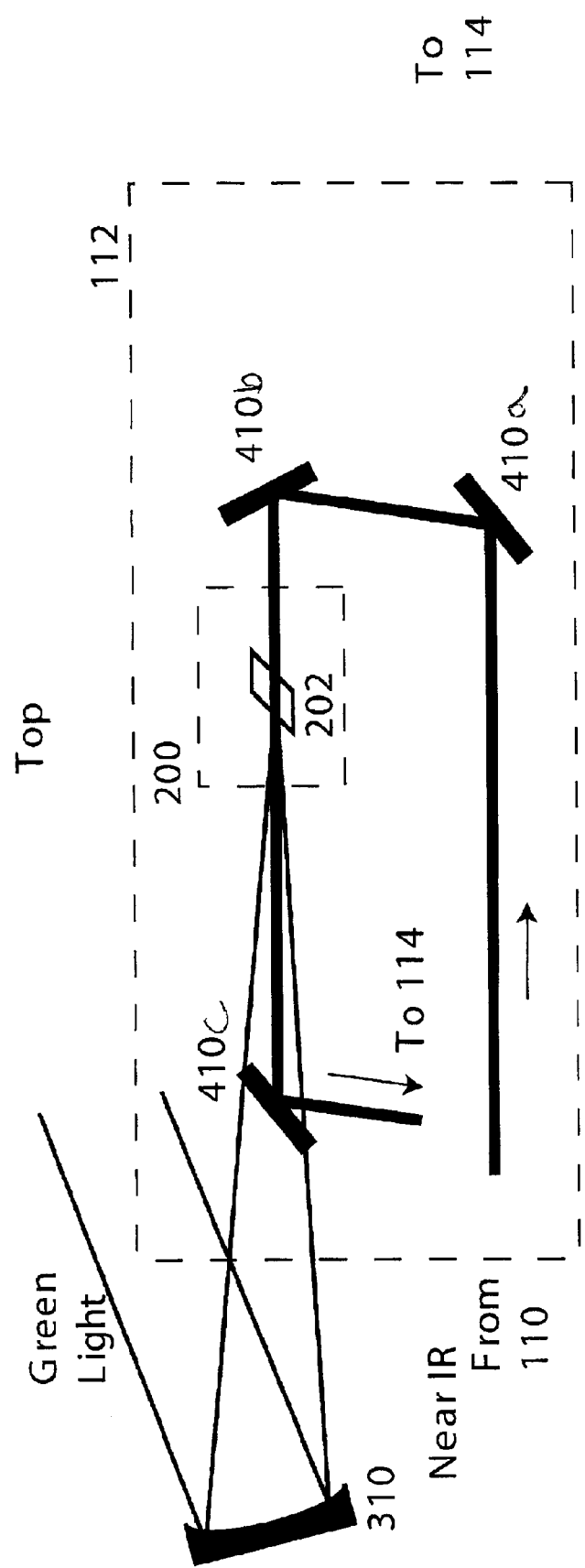
FIG. 6 is a top view of a single pass amplifier according to FIG. 1.

Amplifier 112 may alternatively consist of (for example) a regenerative amplifier (see FIG. 5) or a single pass amplifier (See FIG. 6). In FIG. 5, beam 110 goes through isolator 602, and is injected into amplifier cavity 200 via thin film polarizers 510 and mirror 512. Pockels cell 610 rotates the polarization of beam 110 so that it bounces off of mirror 504 and passes through polarizer 510b. Beam 110 is them amplified in amplifier medium 202, and reflected off of mirror 502. The beam passes through the cavity several times (for example up to about 40 times), after which Pockels cell 610 rotates the polarization so that the amplified beam reflects off of polarizer 510b, and is extracted from the cavity. It then passes through faraday isolator 602, and reflects off thin film polarizer 510a.

FIG. 6 is a top view diagram of an example of a single pass amplifier 112 of FIG. 1. Beam 110 bounces off of mirrors 410a and b to pass through amplifier medium 202 in cell 200. Amplifier medium 202 amplifies beam 110, and it then bounces off of mirror 410c to compressor 114. In order to get high enough gain from a single pass, the amplifying medium is generally a non-linear parametric amplification medium.

While the exemplary preferred embodiments of the present invention are described herein with particularity, those skilled in the art will appreciate various changes, additions, and applications other than those specifically mentioned, which are within the spirit of this invention.

What is claimed is:

1. Single stage laser amplifying apparatus comprising:
   an oscillator assembly for providing input light to be amplified;
   a pump laser for providing pumping; and
   an amplifier for amplifying the input light from on the order of $10^{-9}$ Joules to on the order of $10^{-3}$ Joules, the amplifier pumped by the pump laser;
   wherein the amplifier includes a cryogenically-cooled amplifying medium; and
   wherein the amplifier provides substantially all of the amplification of the amplifying apparatus.

2. The apparatus of claim 1, wherein the average power provided by the apparatus is between 1 Watt and 100 Watts.

3. The apparatus of claim 1, wherein the beam quality $M^2<2$.

4. The apparatus of claim 1, wherein the amplifying medium is a non-linear parametric amplification medium.

5. The apparatus of claim 4, in a single pass, high gain configuration.

6. The apparatus of claim 1, in a regenerative amplifier configuration.

7. The apparatus of claim 1, in a multipass amplifier configuration.

8. The apparatus of claim 1, wherein the amplifying medium has a host selected from the following list—
   a) Sapphire ($Al_2O_3$),
   b) Yttrium-Aluminum Garnett ($Y_2Al_5O_{12}$),
   c) Yttrium-Lithium Flouride ($LiYF_4$),
   d) LiSAF ($LiSrAlF_4$),
   e) LiCAF ($LiCaAlF_4$),
   f) $KY(WO_4)_2$)
   g) $YVO_4$, or
   h) $YAlO_3$;
and wherein the the amplifying dopant has a host selected from the following list—
   a) Titanium ($Ti^{3+}$),
   b) Neodymium ($Nd^{3+}$),
   c) Chromium ($Cr^{3+}$),
   d) Holmium ($Ho^{3+}$),
   e) Erbium ($Er^{3+}$),
   f) Thulium ($Tm^{3+}$),
   g) Praseodymium ($Pr^{3+}$),
   h) Ytterbium ($Yb^{3+}$),
   i) Europium ($Eu^{3+}$),
   j) Dysprosium ($Dy^{3+}$), or
   k) Terbium ($Tb^{3+}$).

9. The apparatus of claim 1, wherein the amplifying medium comprises titanium doped sapphire.

10. The apparatus of claim 1, further including fiber optics for transmitting light between the pump laser and the amplifier.

11. The apparatus of claim 1, wherein the pump laser is selected from the following list:
   a) diode-pumped frequency doubled Nd:YAG,
   b) lamp-pumped frequency doubled Nd:YAG
   c) semiconductor diode laser, d) ruby laser, e) diode-pumped Nd:Vanadate, or f) diode-pumped Nd:YLf.

12. Single stage laser amplifying apparatus comprising:

an oscillator assembly for providing input pulses to be amplified;

a pump laser for providing pumping; and an amplifier for amplifying the input pulses [high gain], the amplifier pumped by the pump laser;

wherein the amplifier includes a cryogenically cooled amplifying medium;

wherein the amplifier provides substantially all of the amplification of the amplifying apparatus; and wherein the amplifying medium is selected from the following list:
- a) $Nd^{3+}:Y_3Al_5O_{12}$
- b) $Nd^{3+}:YAlO_3$
- c) $Ti^{3+}:Al_2O_3$
- d) $Ce^{3+}:LiCaAlF_4$
- e) $Ce^{3+}:LiSrAlF_4$
- f) $Nd^{3+}:LiYF_4$
- g) $Yb^{3+}:Y_3Al_5O_{12}$
- h) $Cr^{3+}:Al_2O_3$
- i) $Cr^{3+}:LiCaAlF_4$
- j) $Cr^{3+}:LiSrAlF_4$
- k) $Pr^{3+}:LiYF_4$
- l) $Nd^{3+}:KY(WO_4)_2$
- m) $Ho^{3+}:YAlO_3$
- n) $Ho^{3+}:Y_3Al_5O_2$
- o) $Ho^{3+}:LiYF_4$
- p) $Er^{3+}:LiYF_4$
- q) $Er^{3+}:Y_3Al_5O_{12}$
- r) $Er^{3+}:YAlO_3$
- s) $Tm^{3+}:YAlO_3$
- t) $Tm^{3+}:Y_3Al_5O_{12}$.

13. The method of amplifying a coherent light beam in a single stage, comprising the steps of:

providing coherent input light to be amplified;

pumping the coherent light with a pump laser; and amplifying the pumped coherent light from on the order of $10^{-9}$ Joules to on the order of $10^{-3}$ Joules with an amplifier;

wherein the amplifier includes a cryogenically-cooled amplifying medium; and wherein the amplifier provides substantially all of the amplification of the amplifying apparatus.

14. The apparatus of claim 13, wherein the average power provided by the apparatus is between 1 Watt and 100 Watts.

15. The apparatus of claim 13, wherein the beam quality $M^2<2$.

16. The apparatus of claim 13, wherein the amplifying medium is a non-linear parametric amplification medium.

17. The apparatus of claim 16, in a single pass, high gain configuration.

18. The apparatus of claim 13, in a regenerative amplifier configuration.

19. The apparatus of claim 13, in a multipass amplifier configuration.

20. The apparatus of claim 13, wherein the amplifying medium has a host selected from the following list—
- a) Sapphire ($Al_2O_3$),
- b) Yttrium-Aluminum Garnett ($Y_2Al_5O_{12}$),
- c) Yttrium-Aluminum Flouride ($LiYF_4$),
- d) LiSAF ($LiSrAlF_4$),
- e) LiCAF ($LiCaAlF_4$),
- f) $YVO_4$, or
- g) $YAlO_3$;

and wherein the the amplifying dopant has a host selected from the following list—
- a) titanium ($Ti^{3+}$),
- b) neodymium ($Nd^{3+}$),
- c) chromium ($Cr^{3+}$),
- d) holmium ($Ho^{3+}$),
- e) erbium ($Er^{3+}$),
- f) thulium ($Tm^{3+}$),
- g) praseodymium ($Pr^{3+}$),
- h) ytterbium ($Yb^{3+}$),
- i) europium ($Eu^{3+}$),
- j) dysprosium ($Dy^{3+}$), or
- k) terbium ($Tb^{3+}$).

* * * * *